United States Patent [19]

Amberg et al.

[11] 4,215,460
[45] Aug. 5, 1980

[54] APPARATUS AND METHOD FOR ASSEMBLYING TUBULAR SLEEVE PREFORMS AND CONTAINERS

[75] Inventors: Stephen W. Amberg; Ralph G. Amberg, both of Toledo, Ohio

[73] Assignee: Owens-Illinois, Inc., Toledo, Ohio

[21] Appl. No.: 939,547

[22] Filed: Sep. 5, 1978

[51] Int. Cl.$^2$ .................... B23P 19/00; B23P 19/04; B29C 7/30
[52] U.S. Cl. .......................................... 29/429; 29/775; 29/822; 156/86; 221/211; 221/218; 264/230
[58] Field of Search .................... 29/775, 429, 773, 430, 29/809, 822; 264/230; 221/211, 218; 156/86

[56] References Cited

U.S. PATENT DOCUMENTS

| | | | |
|---|---|---|---|
| 1,875,110 | 8/1932 | Myers | 29/775 |
| 3,029,499 | 4/1962 | Eddison et al. | 29/775 |
| 3,267,566 | 8/1966 | Ouellette | 29/775 |
| 3,324,537 | 6/1967 | Carter et al. | 29/775 |
| 3,340,591 | 9/1967 | Fisher et al. | 29/775 |
| 3,360,843 | 1/1968 | Pearson | 29/775 |
| 3,767,496 | 10/1973 | Amberg et al. | 156/86 |
| 3,768,136 | 10/1973 | Graham | 29/775 |
| 3,802,942 | 4/1974 | Amberg et al. | 156/86 X |
| 3,959,065 | 5/1976 | Ashcroft | 156/86 X |

Primary Examiner—Charlie T. Moon
Attorney, Agent, or Firm—E. J. Holler; M. E. Click; D. H. Wilson

[57] ABSTRACT

This invention relates to apparatus and method for producing a composite container having a neck label or tubular sleeve mounted temporarily thereon adapted to be shrunken into final surface covering relation. The tubular sleeve is preformed of relatively-stiff material and flat-folded until ready for use when it is fully opened and conveyed into vertical alignment with a container therebeneath. The sleeve preform comprised of heat-shrinkable plastic material is telescopically assembled onto the container while the latter is transported in spaced upright arrangement. The preform is moved downwardly by a pair of gripping vacuum cups moving downwardly and divergently to open the preform and place the same telescopically on the container upper portion. Alternately, the opened preform is placed on a cylindrical mandrel to more fully open the preform prior to its being mounted telescopically on the container neck portion. The preform on the upper portion of the container in finally-aligned relation is then adapted to heat-shrinking in place in permanent conforming arrangement.

22 Claims, 2 Drawing Figures

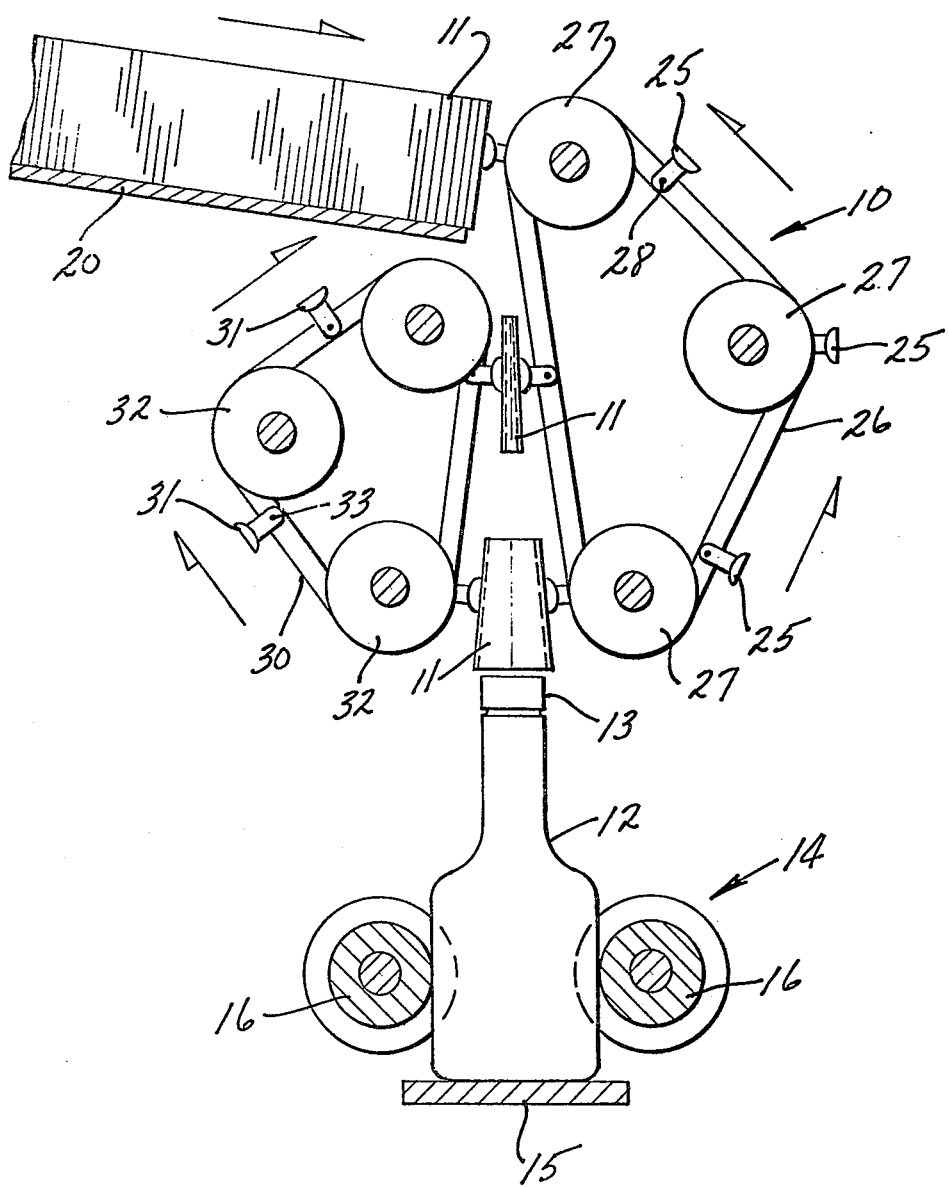

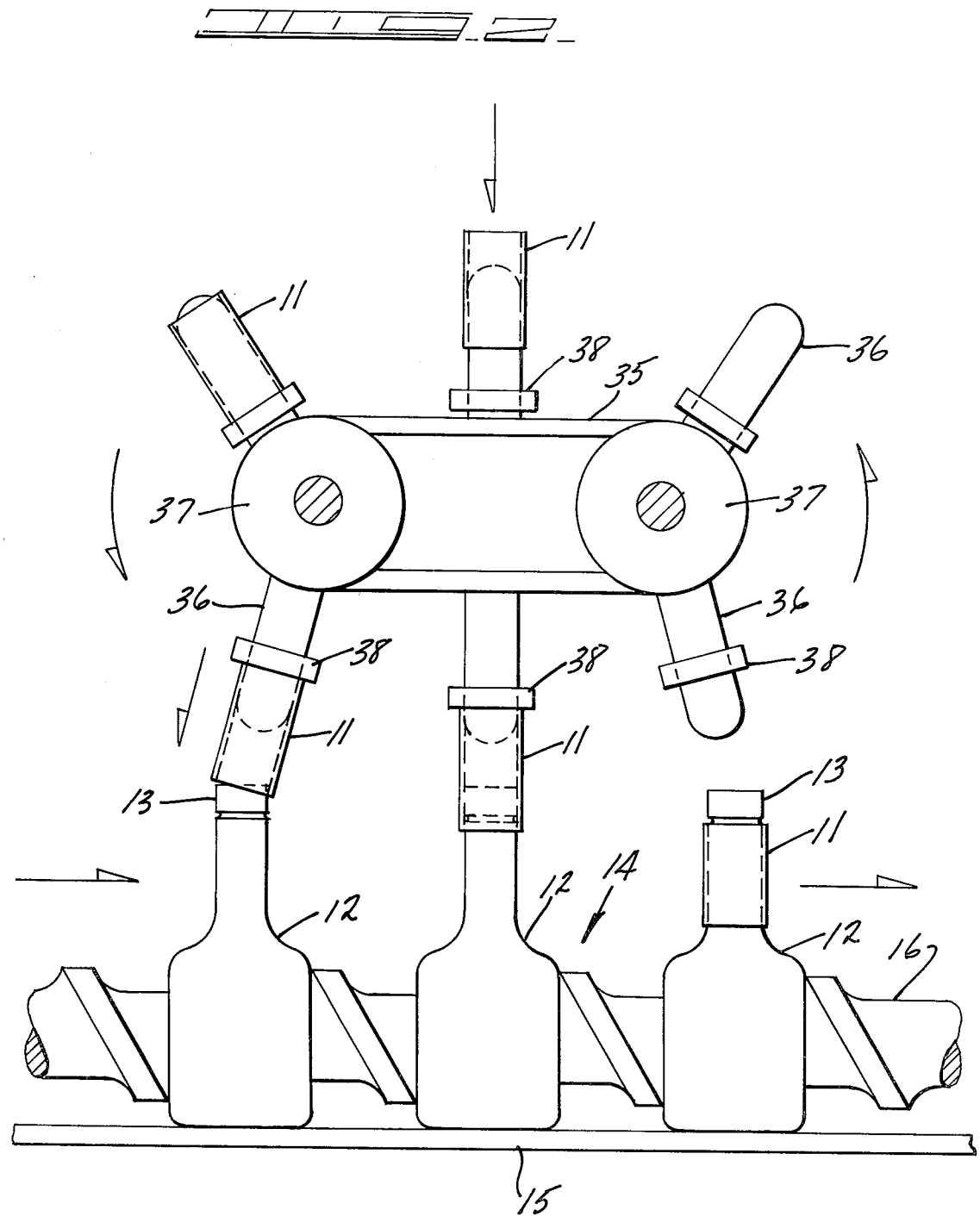

APPARATUS AND METHOD FOR ASSEMBLYING TUBULAR SLEEVE PREFORMS AND CONTAINERS

BACKGROUND OF THE INVENTION

1. Field of the Invention

This invention relates to the manufacture of containers and primarily to the preliminary assembly of a hollow sleeve preform onto an upper extremity of a container for subsequent shrinking in situ thereon. The preform is taken from a stored, flattened condition to a position immediately above the container where it is fully opened and moved into co-axial alignment with the container. The preform is transported downwardly by a pair of pivoted juxtaposed vacuum cups which move downwardly and divergently to open the preform and move it into proximity with the upper portion of the container. The two components are moved into telescopic assembly on intersecting paths of movement. The final shrinking of the preform onto the container, as may be performed by many appropriate physical conditions, is not part of this invention.

2. Description of Prior Art

This invention comprises an improvement over the methods and apparatus disclosed in issued U.S. Pat. Nos. 3,767,496, issued Oct. 23, 1973; 3,802,942 issued Apr. 9, 1974; and U.S. Pat. No. 3,959,065 issued May 25, 1976, all of which are commonly owned by the same assignee as the present application. In each of these disclosures, a tubular sleeve is formed which is telescopically assembled onto the article from below by a push-up mechanism. None of these disclosures pertain to a semi-rigid sleeve which is stored in flattened, prefabricated condition and then telescoped over the container in a telescoping operation with minimum apparatus to permit efficient and rapid assembly.

In many of the previously-disclosed processes and apparatuses for making composite containers having an integral plastic base or sleeve thereon, a manufactured glass bottle or jar is loaded onto a conveyor and preheated prior to mounting the plastic sleeve. The plastic sleeves carried on an underlying turret pass into alignment with the bottles and are moved vertically upwardly into telescopic assembly over the lower ends of the bottles. The sleeves are then carried on the bottles into a heating apparatus such as a tunnel oven wherein appropriate physical conditions shrink the sleeves into close-fitting conforming arrangement over the bottle surfaces where assembled. The heating apparatus commonly consists of a lengthwise oven through which the bottles are passed, the oven temperatures ranging from about 170° to 800° F., depending upon the plastic material selected to comprise the sleeves. U.S. Pat. No. 3,959,065, owned by the common assignee of this application, discloses method and apparatus which assure against dislocation of the sleeve on the bottle without external handling mechanism being required to hold the sleeve in place between its assembly point with the bottle and the shrinking oven.

The cap sealing of bottles has been conventionally performed in recent years to provide for reasons of sanitation, pilfer-proofing, safety and appearance, the further step of placing over and around the neck of the bottle, as well as preferably over at least part of its closure, a tubular sleeve of heat-contracting synthetic resin material, severed to a prescribed length, and then sealing the sleeve to the bottle by thermal contraction. The synthetic resin tubing is usually pressed flat and delivered in rolls in many production processes, and since the tubing may or may not stay fully flattened, particularly where it is comprised of extremely flexible and resilient material, inefficiencies can and do result when the severed lengths of tubing are fitted onto the bottle necks. In some cases, to facilitate the fitting of the short, flat, tubular sleeves onto the necks of bottles, it has been common practice to preform the sleeves such as by putting perforations or scores along their fold lines. It is also possible to apply the tubes around the bottle necks without preforming the material, as taught by U.S. Pat. No. 3,861,918 to Muto; however, such method requires the application of a bonding agent to the bottle neck for adherence of the sleeve. The method and apparatus disclosed by this patent are exceedingly more complex and prone to occasional misapplication of the tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

SUMMARY OF THE INVENTION

An object of this invention is to provide apparatus and method for positively opening a flat-folded, tubular, band or sleeve of relatively-rigid material and placing the same telescopically over the top of a container while both are being continuously moved into axial alignment and subsequently moving the sleeve into further telescopic engagement over the container upper region while it is supported only by the container neck.

The present invention as disclosed hereinafter in a specific preferred embodiment provides both apparatus and method for applying a preformed, relatively-rigid tubular band or sleeve to an upper neck region of a container where it is frictionally retained prior to subsequent heat shrinking of the band onto the container into final conforming relationship. The invention permits opening and telescopic assembly of the band onto the container upper region in a single operation with the band in free-standing partial telescopic arrangement on the container neck. The band is formed of relatively-stiff material and stored in flat-folded condition in a stack with an open end lowermost adjacent a pair of vertically movable facing vacuum cups aligned in spaced-apart relation. The vacuum cups serve to remove the bands serially from the supply source and open each flat-folded band during its downward travel. During its downward travel, a leading edge of the opened band is engaged by an upper region of the container in timed relation so that the band is telescoped thereover.

A major feature of the invention is a vacuum pick-up device capable of delivery of an individual tubular preform in nearly completely opened condition from a nested stack of flattened preforms to a container upper region for disposition thereon prior to its complete opening when in telescoped vertical alignment.

A further feature of the invention is the provision of the vacuum pick-up device mounted adjacent the stack of flattened tubular preforms to assure delivery of an individual sleeve to the container neck region even at accelerated rates of operation of the combined apparatus.

A still further feature of the invention is the telescopic movement of the tubular sleeve over the container neck while supported by a pair of diverging vacuum cups for convenient and economical application thereof onto the container neck during their continuous movement at production speed prior to heat shrinkage of the sleeve onto the surrounded circumferential surface area which sleeve may also provide a pilfer-proofing feature.

BRIEF DESCRIPTION OF THE DRAWINGS

FIG. 1 is a side elevational view of a machine for applying tubular plastic sleeves onto bottles incorporating the improvements of the present invention.

FIG. 2 is a side elevational view of another version of the present invention wherein a series of cylindrical mandrels is employed intermediate one portion of the FIG. 1 machine and the containers for more fully opening the tubular plastic sleeves.

DESCRIPTION OF PREFERRED EMBODIMENT

As shown in FIG. 1 of the drawings, the apparatus for producing containers with plastic sleeves thereon consists of a banding machine 10 which is adapted to receive and downwardly convey the sleeves 11 while they are simultaneously being opened. The containers 12 preferably consist of hollow rigid, glass or plastic bottles which may or may not have a closure 13 thereon, thus being either in filled or unfilled condition, as desired.

As shown in FIG. 1, the containers 12 are delivered to the banding machine 10 serially in spaced-apart arrangement by a worm feed device 14 which is rotated in synchronism with movement of a linear conveyor 15. Conveyor 15 is of conventional construction normally adapted to convey the containers in upright contacting relation between a pair of parallel side rails. The worm feed device 14 is designed to receive a lineal alignment of upright containers in physically-contacting, close relation from the conveyor 15 and separate the same into equally-spaced arrangement for delivery to the machine 10. Normally the worm feed device 14 has either one or two continuous screw thread elements 16 with a pitch distance generally complemental to the desired spacing of the containers for their continuous delivery to the banding machine. The screw thread elements of the worm feed device 14 are aligned parallel to and above conveyor 15 to receive the lineal alignment of upright containers in physically-contacting relation and separate them into equi-spaced arrangement for passage through the banding machine 10. The axes of thread elements 16 of the worm feed device 14 extend horizontally, the thread elements replacing the conveyor side rails (not shown) for a limited distance.

A stack of folded sleeves 11 is held in a suitable holder 20 having dimensions closely complemental to the retained flattened stack of sleeves. The holder is slightly smaller at the sides of its exit area. The sleeves 11 are uniformly and tightly packed in flattened condition aligned vertically with an open end lowermost in the stack, as shown in FIG. 1. The sleeves are retained flat-folded in the holder 20 so that an individual vacuum cup 25 must exert some pulling pressure on the outermost sleeve to pull it from the sightly restricted area of the holder and in so doing partially open the sleeve. The tubular sleeves are prefabricated either seamless or having an axial fusion seal along one side. The sleeves are formed having a slightly greater diameter than the exterior diameter of the container neck area and closure, and folded flat at opposing sides so that the seal line extends along one flat side.

The sleeves 11 are preferably comprised of foamed medium impact polystyrene or foamed polyethylene having a wall thickness ranging from 0.002 to 0.030 inch. The material has a preferred density of 2 to 30 pounds per cubic foot with the primary orientation extending in a circumferential direction around the preformed sleeves. The preformed sleeves are relatively-rigid or semi-rigid having a stiffness in Taber units of 22 to 26 around the sleeve circumference, and 7 to 11 in the axial direction of the sleeve. Taber units are a well known measure of stiffness used in the paper industry. The sleeves are heat-shrinkable both circumferentially and axially due to orientation of the material as formed to facilitate shrinkage around the surrounded surfaces.

A series of equi-spaced vacuum cups 25 adapted to receive the sleeves 11 is mounted on a conveyor chain 26 which is trained around a series of rotatable sprockets 27. At least one of the sprockets is driven by a suitable power source (not shown) so that the driven chain is capable of rotating the vacuum cups 25 at a prescribed lineal speed in a vertical plane. The primary vertical reach of the chain extends from the delivery end of sleeve holder 20 to closely adjacent the upper extremity of the conveyed containers 11 so that each sleeve may be moved continuously downwardly. Each of the vacuum cups 25 is mounted on the chain 26 in pivotal relation so that the cups can move freely during pick-up and delivery of an individual sleeve 11.

A second drive chain 30 is mounted closely adjacent and parallel to chain 26 so that the facing reaches of the chains extend downwardly and divergently in a vertical direction. Second chain 30 also has a series of spaced-apart vacuum cups 31 thereon aligned having the same spacing as the cups 25 on chain 26. At least one of the sprockets 32 of chain 30 is driven by a suitable power source so that chains 26 and 30 are operated in synchronism at the same circumferential speed. Thus, while the chains are different lengths as shown in FIG. 1, i.e., with one having five vacuum cups and the other four, the chains are operated together in such manner that the two cups are moved in facing relation during the downward travel of the juxtaposed cups. Cups 25 and 31 are mounted on pivotal mounting members 28 and 33 on the respective chains so that the cups are free to move laterally.

The cups 25 and 31 are mounted on the chains so that they meet slightly off-center so that a vacuum cup is not pulled off by a facing pair in precise alignment contacting each other without a sleeve therebetween. The upper end of longer chain 26 is adapted to be moved laterally toward and away from the delivery end of sleeve holder 20 so that smooth most efficient pick-up of an individual sleeve is ensured. As a vacuum cup 25 passes over upper sprocket 27, it passes into close proximity with the outermost sleeve 12 to contact and engage the same by pressure contact. Positive vacuum is maintained on each of the cups 25 during operation of the machine through a vacuum manifold (not shown) traveling with chain 26. Similarly positive vacuum is maintained on cups 31 mounted on chain 30. The two chains 26 and 30 are mounted with their planes of rotation substantially perpendicular to the direction of travel of containers 12 on conveyor 15.

Following pick-up of an individual sleeve 11 by vacuum cup 25, the sleeve is conveyed downwardly where it is immediately engaged by second juxtaposed vacuum cup 31. The two cups thus contact and engage opposing sides of the flattened sleeve 11. As the two cups move downwardly and divergently, the sleeve is continuously moved and opened therebetween into nearly completely opened condition.

When the sleeve 11 nears the end of its continuous downward travel while retained by both cups 25 and 31, the lowermost edge is contacted by the upper extremity of the container, i.e., its closure 13 or upper surface contacting the leading edge of the sleeve 11 adjacent a fold line to assist its mounting on the container neck portion. Thus, as the sleeve continues its downward travel while held by cups 25 and 31, the container during its continuous movement helps to guide the sleeve thereon while the cups are free to turn pivotally at the sides of the moving container neck. As the cups complete their lowermost travel and are moved away as chains 26 and 30 travel arcuately around the lowermost sprockets, and the cups lose contact with the sleeve by breaking the vacuum, the sleeve is free to fall by gravity onto its desired temporary position on the container neck. The conveyor 15 is continuously operated in precisely timed sequence with the two chains bearing cups 25 and 31 in order to bring the container and sleeve into proper intersecting relation for most efficient sleeve application.

Containers 12 having sleeves 11 mounted thereon in temporary alignment are then continuously moved further by conveyor 15 to a heat-shrinking operation. Depending upon the selection of the thermoplastic material for sleeves 11, the containers bearing the sleeves are passed through a tunnel oven (not shown) having an internal temperature ranging from about 170° to 800° F. The sleeves then rapidly shrink and conform to the underlying surface areas therebeneath. The sleeves due to their extensive circumferential orientation are able to shrink tightly around the closure and neck areas thus providing a tamper-proofed structure.

An alternative form of the present invention is shown in FIG. 2. The containers 12 are continuously transported past the sleeve-applying station by worm screw elements 16 while still retained on conveyor 15. The same pair of downwardly and divergently rotatable chains 26 and 30 as shown in FIG. 1 is mounted above the containers. Intermediate the moving containers and the lower extremity of the chain sprockets 27 and 32 is located a third chain 35 bearing a spaced-apart series of cylindrical mandrels 36. The chain 35 is mounted having two horizontal reaches, the lower being parallel and adjacent the upper extremity of the conveyed containers. The upper reach extends adjacent and in the path of the two vacuum cups 25 and 31 so that an individual sleeve 11 may be deposited on an individual mandrel 36 as indicated by the arrow in FIG. 2. The sleeve in nearly fully opened condition as it nears the lower end of the two chains 26 and 30 is dropped down onto the mandrel 36 which serves to more fully open same. Chain 35 is driven by one of the two sprockets 37 being powered so that it travels in a counterclockwise direction with its lower reach continuously moving in the same direction as conveyor 15. The sleeves 11 are serially loaded onto mandrels 36 which continuously move in timed relation to delivery of the sleeves from the pair of vacuum cups. The sleeves upon entry onto the mandrels 36 fall downwardly against a stripper element 38 which surrounds each mandrel and is movable thereon. After the sleeves pass around the sprocket 37 near the incoming side of conveyor 15, the stripper element is operated downwardly by a camming mechanism to remove the sleeve from its supporting mandrel and the sleeve is placed on a container upper region moving coaxially therebelow. Once the sleeve is placed thereon, vibratory forces of the container being moved along conveyor 15 to serve to further lower the sleeve into its temporary position for heat-shrinking.

The sleeve 11 is shown below closure 13 in FIG. 2 although it may be mounted to surround both the closure and exposed container neck portion immediately below for heat-shrinking therearound.

In the modification shown in FIG. 2, mandrel chain 35 is operated in precisely timed sequence with both the vacuum cups 25 and 31 as well as conveyor 15 to ensure that the sleeves are received on each mandrel 36 and that each mandrel deposits its retained sleeve 11 on a container. Timing is capable of conventional practice where all elements are operated by a central power source.

Various modifications may be resorted to within the spirit and scope of the appended claims.

We claim:

1. Combined apparatus for applying a tubular band to an article continuously moving along a horizontal path comprising means for supplying a preformed heat-shrinkable semi-rigid tubular band in flat-folded condition, vacuum means adapted to movement downwardly and divergently to grip juxtaposed exterior surfaces of said band and to effect its major opening while transporting the same along a downward path, means for continuously conveying the article in upright timed relation with its upper extremity closely adjacent and physically contacting the lower extremity of a lowered open band while still retained by said vacuum means, said band having a slightly greater diameter than the exterior diameter of an upper portion of said article, said vacuum means being pivotally mounted to facilitate pivotal movement of said band upon contact by said article to assist its delivery thereon.

2. Combined apparatus in accordance with claim 1, wherein said vacuum means comprises a pair of pivoted vacuum cups adapted to downward and divergent movement in juxtaposed facing relation adapted to engage and separate opposing flat surfaces of said flat-folded band for essentially fully opening the same.

3. Combined apparatus in accordance with claim 1, wherein the means for supplying the said preformed tubular band comprises a holder for a nested stack of flat-folded bands with their open ends in vertical alignment mounted adjacent and facing said vacuum means.

4. Combined apparatus in accordance with claim 1, wherein said heat-shrinkable tubular band is comprised of foamed polystyrene or foamed polyethylene having a thickness ranging from about 0.002 to 0.030 inch.

5. Combined apparatus in accordance with claim 2, wherein said means for continuously conveying the article in upright, equi-spaced, timed relation comprises a lineal conveyor adapted to transport the said article between a lowermost alignment of a pair of pivoted vacuum cups constituting said vacuum means for engagement of said band by an upper portion of said article for delivery thereon.

6. Combined apparatus in accordance with claim 1, wherein said vacuum means comprises two reaches of spaced-apart vacuum cups arranged to cooperate in pairs in downward and divergent relationship for gripping opposing exterior surfaces of said band for essentially fully opening the same prior to delivery onto said article.

7. Combined apparatus in accordance with claim 1, wherein said article and said band are conveyed in timed sequence so that the upper extremity of said article and the opened band physically and telescopically engage during their respective horizontal and downward travel.

8. Combined apparatus for applying a tubular band to a container continuously moving along a horizontal path comprising a supply means of preformed heat-shrinkable tubular bands of predetermined length and diameter retained in flat-folded condition, vacuum means consisting of two reaches of equi-spaced vacuum cups arranged in cooperative pairs in downward and divergent relation adapted to gripping opposing exterior surfaces of an individual flattened band delivered from said supply means for fully opening same, conveyor means for continuously transporting the containers in equi-spaced, timed relation with the upper extremity of each container closely adjacent and physically contacting the lower extremity of a lowered opened band while still retained at a lowermost position by said vacuum means, said vacuum cups being pivotally mounted to facilitate pivotal movement of said band upon contact by the upper extremity of said container to assist its delivery thereon.

9. Combined apparatus in accordance with claim 8, wherein said supply means consist of a holder for a nested stacked plurality of flat-folded bands mounted adjacent and facing said vacuum means.

10. Combined apparatus in accordance with claim 8, wherein said vacuum means consist of two continuous belts having two facing divergent reaches extending vertically downwardly with said cooperative pairs of equi-spaced vacuum cups mounted thereon adapted to juxtaposed and divergent travel with an individual band therebetween for opening same.

11. Combined apparatus in accordance with claim 8, wherein said conveyor means consists of a worm screw feed for equi-spacing said containers in a position immediately below and in alignment normal to the direction of travel of said two divergent reaches of said vacuum means.

12. Combined apparatus in accordance with claim 8, wherein said tubular bands consist of rigid or semi-rigid foamed polystyrene or foamed polyethylene having a thickness ranging from about 0.002 to 0.030 inch, said bands having a diameter slightly greater than the upper portion of said containers.

13. Combined apparatus for applying a tubular band to a container continuously moving along a horizontal path comprising a supply means of preformed heat-shrinkable tubular bands of predetermined length and diameter retained in flat-folded condition, vacuum means consisting of two reaches of equi-spaced vacuum cups arranged in cooperative pairs in downward and divergent facing relation adapted to gripping opposing exterior surfaces of an individual band delivered from said supply means for partially opening same, a series of cylindrical mandrels of lesser diameter than said bands mounted on an endless belt in equi-spaced vertical arrangement in a path intersecting the path of said lowermost opened band, conveyor means for continuously transporting the containers in equi-spaced timed relation immediately below said series of mandrels and in the same spacing, the opened bands adapted to loading onto said mandrels serially for their further opening, the mandrels adapted to vertical rotation in a vertical plane on said belt to effect delivery of said bands onto said containers passing serially therebeneath.

14. Combined apparatus in accordance with claim 13, including stripper means adapted to remove said bands from said mandrels onto an upper portion of each said container.

15. Combined apparatus in accordance with claim 13, wherein said vacuum means including the two facing reaches of vacuum cups, the said endless belt carrying the series of cylindrical mandrels, and the conveyor means are all operated in synchronism for delivery of said bands onto said containers.

16. The method of applying a tubular band to the upper portions of a container comprising the steps of supplying a preformed heat-shrinkable semi-rigid tubular band in flat-folded condition, transporting said band downwardly by a pair of vacuum cups moving downwardly and divergently gripping opposing exterior surfaces of said band for opening same, conveying the said container in upright timed relation so that its upper portion contacts the lower extremity of said band, and telescoping said band over the upper portion of said container during their intersecting travel.

17. The method in accordance with claim 16, including the step of transporting said band downwardly with its fold lines parallel to the direction of travel of said containers for opening said band prior to its contacting said container.

18. The method in accordance with claim 16, including the step of transporting said band downwardly in pivotal relation with its pivotal axis normal to the direction of travel of said container.

19. The method in accordance with claim 16, including the step of gripping opposing exterior surfaces of said band with a facing pair of vacuum cups moving downwardly and divergently for opening said band.

20. The method in accordance with claim 16, including the step of placing said band on a cylindrical mandrel for more fully opening same prior to its being telescoped over the upper portion of said container.

21. The method in accordance with claim 20, including the step of stripping said band from said mandrel onto said container during its horizontal upright travel.

22. The method in accordance with claim 16, wherein said band consists of semi-rigid foamed polystyrene or foamed polyethylene having a thickness ranging from about 0.002 to 0.030 inch and having a diameter slightly greater than the upper portion of said container.

* * * * *